(12) United States Patent
Friant et al.

(10) Patent No.: US 12,355,778 B2
(45) Date of Patent: Jul. 8, 2025

(54) SYSTEMS AND METHODS FOR MANAGING ACCESS CONTROL

(71) Applicant: Comcast Cable Communications, LLC, Philadelphia, PA (US)

(72) Inventors: Sarah Friant, Philadelphia, PA (US); Colleen Szymanik, Horsham, PA (US); Myra Einstein, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 180 days.

(21) Appl. No.: 16/057,334

(22) Filed: Aug. 7, 2018

(65) Prior Publication Data
US 2020/0053095 A1    Feb. 13, 2020

(51) Int. Cl.
*H04L 9/40*    (2022.01)

(52) U.S. Cl.
CPC ........ *H04L 63/107* (2013.01); *H04L 63/0876* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 7,523,485 B1 * | 4/2009 | Kwan | ................. | H04L 63/1466 726/2 |
| 8,577,998 B2 * | 11/2013 | Ver Steeg | ......... | H04L 29/12933 370/254 |
| 9,363,092 B2 * | 6/2016 | Crawley | ............. | H04L 12/1827 |
| 9,450,958 B1 * | 9/2016 | Saylor | ................... | H04L 63/102 |
| 9,660,974 B2 * | 5/2017 | Grajek | ..................... | G06F 21/64 |
| 9,721,036 B2 * | 8/2017 | Shen | .................. | G06F 16/9577 |
| 10,019,736 B2 * | 7/2018 | Sankaran | ........... | G06Q 30/0269 |
| 10,044,724 B2 * | 8/2018 | Warrick | .................. | H04L 63/02 |
| 10,193,864 B2 * | 1/2019 | Toy | ..................... | H04L 67/1097 |
| 10,200,377 B1 * | 2/2019 | Vazquez | ............. | H04L 63/0823 |
| 10,255,419 B1 * | 4/2019 | Kragh | .................... | G16H 50/30 |
| 10,305,914 B1 * | 5/2019 | Brin | ...................... | H04L 9/3239 |
| 10,320,803 B2 * | 6/2019 | Gratton | ................... | G06F 21/10 |
| 10,333,934 B1 * | 6/2019 | Fox | .................... | H04L 63/0876 |
| 10,356,457 B1 * | 7/2019 | Greenfield | ....... | H04N 21/25816 |
| 10,389,793 B2 * | 8/2019 | Parab | .................... | H04L 63/104 |
| 10,530,771 B2 * | 1/2020 | Stevens, III | ........ | H04L 63/0853 |
| 2002/0120867 A1 * | 8/2002 | Mitchell | ............. | H04L 63/0815 726/7 |
| 2002/0141582 A1 * | 10/2002 | Kocher | ............ | G11B 20/00173 380/201 |
| 2004/0003051 A1 * | 1/2004 | Krzyzanowski | ........ | H04L 67/18 709/217 |
| 2004/0243832 A1 * | 12/2004 | Wilf | ........................ | H04L 63/08 726/4 |
| 2005/0182727 A1 * | 8/2005 | Robert | ................ | H04L 63/0823 705/51 |

(Continued)

*Primary Examiner* — Piotr Poltorak
(74) *Attorney, Agent, or Firm* — BakerHostetler

(57) ABSTRACT

Systems and methods are described for managing access control. An example method may comprise receiving an address associated with a user device. An identifier may be determined based on the address. Based on the identifier, the user device may be determined to be associated with a trusted user. Based on the determination that the user device is associated with the trusted user, the user device may be granted access to a trusted network service.

30 Claims, 7 Drawing Sheets

(56) References Cited

U.S. PATENT DOCUMENTS

| | | | |
|---|---|---|---|
| 2008/0104672 A1* | 5/2008 | Lunde | H04L 63/1441 726/3 |
| 2008/0219241 A1* | 9/2008 | Leinonen | H04L 61/30 370/352 |
| 2010/0098083 A1* | 4/2010 | Yamazaki | H04L 12/2876 370/392 |
| 2010/0146609 A1* | 6/2010 | Bartlett | G06Q 20/02 726/7 |
| 2010/0246421 A1* | 9/2010 | Marshall | H04L 41/12 370/252 |
| 2010/0255782 A1* | 10/2010 | Klemmensen | H04W 76/14 455/41.2 |
| 2011/0179233 A1* | 7/2011 | Golbourn | H04L 41/5009 711/154 |
| 2012/0005298 A1* | 1/2012 | Choi | H04L 61/106 709/208 |
| 2012/0233665 A1* | 9/2012 | Ranganathan | G06F 21/51 726/4 |
| 2012/0266222 A1* | 10/2012 | Klatsky | H04L 63/101 726/7 |
| 2013/0007868 A1* | 1/2013 | Hoggan | H04L 9/3263 726/8 |
| 2013/0065564 A1* | 3/2013 | Conner | G06K 19/0718 455/414.1 |
| 2013/0110443 A1* | 5/2013 | Bates | G06F 11/3664 702/108 |
| 2013/0117821 A1* | 5/2013 | Tock | H04L 63/102 726/4 |
| 2013/0308470 A1* | 11/2013 | Bevan | H04W 36/32 370/252 |
| 2013/0318581 A1* | 11/2013 | Counterman | H04L 63/08 726/7 |
| 2014/0006283 A1* | 1/2014 | Hogg | G06Q 20/384 705/44 |
| 2014/0280632 A1* | 9/2014 | Torgersrud | H04L 63/102 709/206 |
| 2015/0089568 A1* | 3/2015 | Sprague | H04L 63/06 726/1 |
| 2015/0128242 A1* | 5/2015 | Hoy | H04L 63/08 726/9 |
| 2016/0088068 A1* | 3/2016 | Toy | H04L 67/1097 709/219 |
| 2016/0173526 A1* | 6/2016 | Kasman | H04L 63/1458 726/23 |
| 2016/0182479 A1* | 6/2016 | Kaplan | H04L 63/08 726/6 |
| 2016/0292601 A1* | 10/2016 | Pakanathi | G06Q 10/06311 |
| 2018/0041374 A1* | 2/2018 | Hasek, IV | G06N 3/063 |
| 2018/0108003 A1* | 4/2018 | Todasco | H04L 63/107 |
| 2018/0260539 A1* | 9/2018 | Puri | G06F 21/44 |
| 2018/0376526 A1* | 12/2018 | Duncan | H04M 3/42263 |
| 2019/0050557 A1* | 2/2019 | Martin | H04L 63/20 |
| 2019/0286832 A1* | 9/2019 | Szeto | H04L 63/102 |

\* cited by examiner

SYSTEMS AND METHODS FOR MANAGING ACCESS CONTROL

BACKGROUND

It is common for a visitor to a premises to need access to a resource. For example, a visitor to a premises may want to pair a mobile device with speakers at the premises for the purpose of playing music from an application executing on the mobile device. As another example, a visitor to a premises may want a mobile device to access a network (such as the Internet) via a gateway device (such as a cable modem). However, pairing a mobile device with a resource may be a difficult task. Additionally, connecting a mobile device with a gateway device may require disclosure of information (such as a password) that a user may not want to share with a visitor.

SUMMARY

Systems and methods are described for managing access control. An example method may comprise receiving an address associated with a user device such as a computer-readable address. The address may be used to determine an identifier, such as a human-readable identifier. It may be determined that the identifier is associated with a trusted user. As such, the user device may be granted access to a trusted network service based on at least the determination that the identifier is associated with a trusted user.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
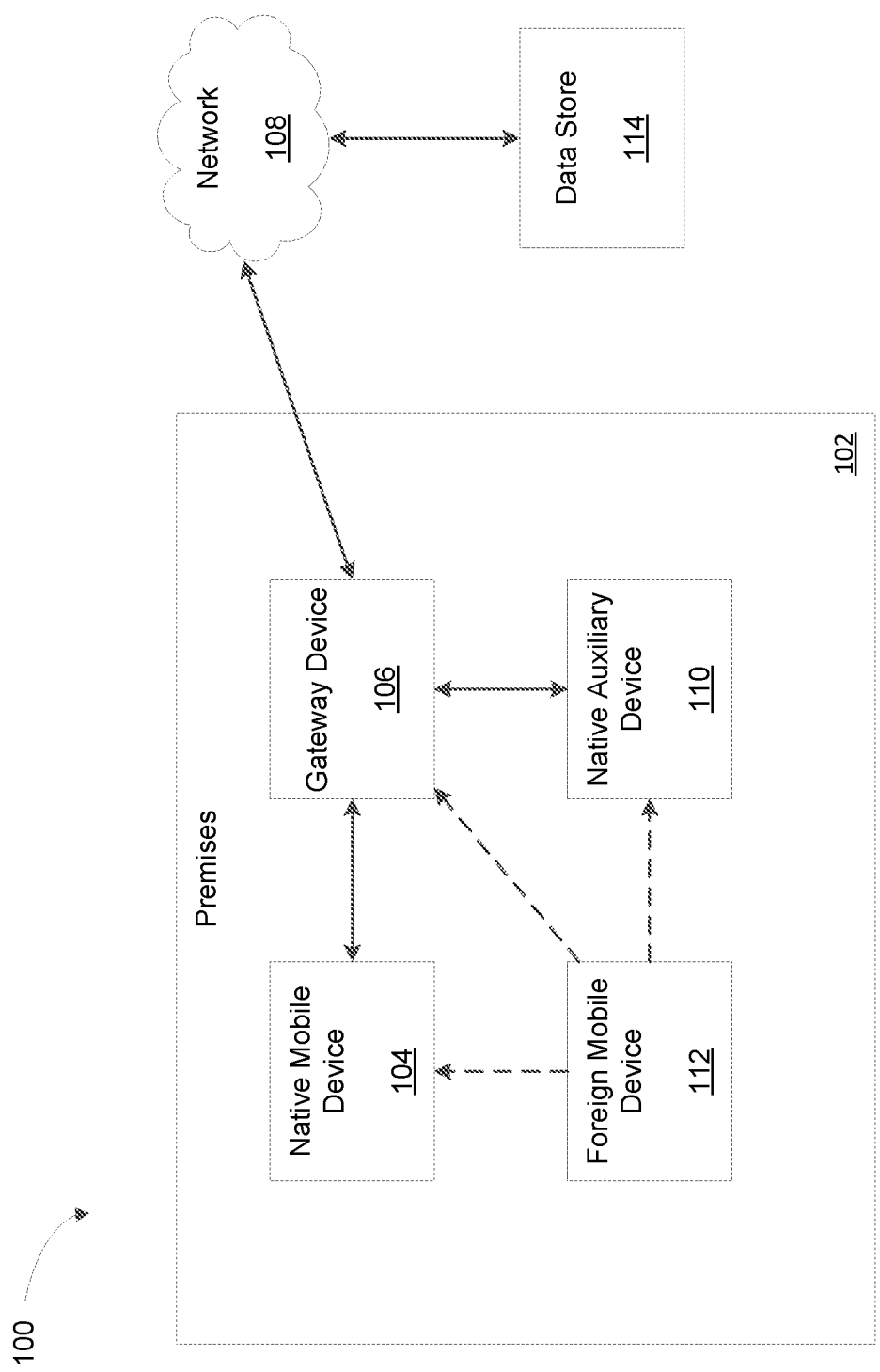
FIG. 1 is a block diagram of an example premises.

Systems and methods are described for managing access control. Managing access control may comprise granting access of a shared resource to a device based on knowledge of a user associated with the device. There are many applications and many resources with which the systems and/or methods described herein may be used. A visitor to a premises may want to stream audio from an audio streaming application on a mobile device associated with the visitor ("a foreign mobile device") to speakers in the premises without having to manually pair the foreign mobile device to the speakers. A visitor to a premises may want to connect to a network (such as the Internet), using a wireless fidelity (Wi-Fi) network associated with the premises. A gateway device and/or a mobile device associated with the premises ("a native mobile device") may listen to (e.g., wait for, be triggered by, etc.) probe requests sent out periodically by wireless devices, such as the foreign mobile device.

The probe requests may be made using any communication protocol, such as Institute of Electrical and Electronics Engineers (IEEE) 802.11, Bluetooth, ultra-wideband (UWB), Zigbee, WiMAX, or any other communication protocol. The probe requests may comprise an address (e.g., media access control (MAC) address) of the foreign mobile device. The gateway device and/or the native mobile device may access a data store. The data store may be associated with a service provider. The data store may comprise a plurality of addresses (e.g., list of MAC addresses). The data store may comprise a list of identifiers associated with the addresses, such as phone numbers, account numbers, device user first names, device user last names, email addresses, usernames, device user home or work addresses, instant messenger identifications, device user dates of birth, etc. The gateway device and/or the native mobile device may retrieve an identifier associated with the foreign mobile device from the data store using the MAC address of the foreign mobile device. The gateway device and/or the native mobile device may retrieve the phone number of the foreign mobile device using a MAC address of the foreign mobile device.

The identifier associated with the foreign mobile device may be checked against (e.g., compared to) a contact list. The native mobile device may comprise the contact list or may reference the contact list at a location remote from the native mobile device. The native mobile device may search the contact list for the phone number of the foreign mobile device. The gateway device may access the contact list stored on the native mobile device. The gateway device may access the contact list via an application and may search the contact list for the phone number of the foreign mobile device. The contact list may comprise contacts on a social media platform. As non-limiting examples, the contact list may comprise friends on a Facebook account, followers or followed users of an Instagram or Twitter account, or starred contacts on a Slack account. The contact list may comprise parties of a digital transaction, such as payees or payors of a PayPal account. If the contact list comprises the phone number for the foreign mobile device, then the foreign mobile device may be considered a "trusted" device. If the contact list does not comprise the phone number for the foreign mobile device, then the foreign mobile device may be considered an "untrusted" device.

A plurality of contact lists may be created, where members of a particular contact list or grouping is associated with certain access control parameters. For example, one contact list may be associated with network resources and services such as content services, while a second contact list may be associated with security services. As such, a user may use the contact lists to manage access control of visiting devices accessing a premise network and network resources or services.

The native mobile device and/or the gateway may appear as the resource to the foreign mobile device and may forward information received from the foreign mobile device to the resource. The native mobile device and/or the gateway may appear as the resource to the foreign mobile device and may forward information received from the foreign mobile device to the resource based on the determination that the foreign mobile device is "trusted." For example, the native mobile device may comprise an application with a user interface that allows a user to select resources to share with the foreign mobile device. If the user selects that the speakers may be shared, then the native mobile device may appear to be the speakers to the foreign mobile device. The foreign mobile device may stream music from the music streaming application to the native mobile device, which, in turn, may stream the music to the speakers. The gateway device may store an indication of the MAC address of the foreign mobile device to an access control list (ACL).

The native mobile device may proxy a pairing between the foreign mobile device and the speakers with the native mobile device performing an entitlement check. The resource (in this case, the speakers) may be listed on the foreign mobile device.

The application running on the foreign mobile device may handle communication between the foreign mobile device and the resource once the foreign mobile device is deemed "trusted." For example, the music streaming application may receive a communication from the native mobile device and/or the gateway that the foreign mobile device is deemed "trusted". In response to the communication, the application may cause the speakers to show up as a selectable device for streaming on a user interface associated with the music streaming application on the foreign mobile device. Upon selection, the foreign mobile device may stream music from the music streaming application to the speakers.

The native mobile device and/or the gateway device may maintain a list (e.g., registry, etc.) of addresses (e.g., MAC addresses) that have been deemed to be "trusted" and/or "untrusted" to skip the lookup process on subsequent encounters with the foreign mobile device.

The native mobile device may comprise a calendar. The calendar may indicate that a user associated with an entry in the contact list will come to the premises at a particular time on a particular date. At or prior to the particular time on the particular date, a mobile device associated with the entry in the contact list may be pre-authorized, so that the mobile device automatically pairs with the gateway device based on the user arriving at the premises.

FIG. 1 is a block diagram 100 of an example premises 102. The premises 102 may comprise a native mobile device 104, a gateway device 106, and a native auxiliary device 110. Although only one native mobile device 104 is shown, the premises may comprise more than one native mobile device 104. Although only one gateway device 106 is shown, the premises may comprise more than one gateway device 106. Although only one native auxiliary device 110 is shown, the premises may comprise more than one native auxiliary device 110.

The native mobile device 104 may comprise a smart phone, a tablet, a laptop, a wearable computing device, or any other appropriate computing device. The native mobile device 104 may be associated with an account (such as a service provider account) associated with the premises 102. The native mobile device 104 may be in communication with the gateway device 106. The native mobile device 104 and the gateway device 106 may communicate using IEEE 802.11, Bluetooth, ultra-wideband (UWB), Zigbee, WiMAX, or any other communication protocol appropriate for communication between two devices local to a premises.

The gateway device 106 may comprise a cable modem, or any device that provides the premises 102 with access to a network 108, such as the Internet. The gateway device 106 may communicate with other devices, such as a data store 114 via the network 108. The network 108 may comprise a local area network (LAN) or a general wide area network (WAN), as examples. The gateway device 106 may communicate with the data store 114 using internet protocol (IP) or any other communication protocol appropriate for communication between two devices communicating over the network 108. The data store may comprise a list (e.g., registry) of addresses (e.g., MAC addresses). The data store may associate the addresses with identifiers (e.g., phone numbers, names, account numbers, device user first names, device user last names, email addresses, usernames, device user home or work addresses, instant messenger identifications, device user dates of birth, etc.).

The native auxiliary device 110 may comprise a resource. The resource may comprise an output device, such as speakers or a display. The resource may comprise a media player, such as a television or a music player. The resource may comprise a home automation device, such as an appliance, a lighting control device, a temperature control device, or a power or energy control device, or a home automation hub. The resource may comprise a premises management device or a security system device, such as an alarm, a sensor, a camera, a control panel, a lock, a window, or a door. The resource may comprise any resource capable of network connectivity. The native auxiliary device 110 may be in communication with the gateway device 106. The native auxiliary device 110 and the gateway device 106 may communicate using IEEE 802.11, Bluetooth, ultra-wideband (UWB), Zigbee, WiMAX, or any other communication protocol appropriate for communication between two devices local to a premises.

A foreign mobile device 112 may enter the premises 102. The foreign mobile device 112 may comprise a smart phone, a tablet, a laptop, a wearable computing device, or any other appropriate computing device. The foreign mobile device 112 may be associated with an account (such as a service provider account) that is not associated with the premises 102. The foreign mobile device 112 may send (e.g., broadcast) a probe request. The probe request may comprise an indication of an address (e.g., MAC address) of the foreign mobile device 112. The foreign mobile device 112 may send the probe request using IEEE 802.11, Bluetooth, ultra-wideband (UWB), Zigbee, WiMAX, or any other communication protocol appropriate for communication between two devices local to a premises.

The native mobile device 104 and/or the gateway device 106 may receive the probe request. The native mobile device 104 and/or the gateway device 106 may determine if the foreign mobile device 112 is deemed to be "trusted". If the foreign mobile device 112 is deemed to be "trusted", then the foreign mobile device 112 may be paired to the native auxiliary device 110 and/or allowed to control the native auxiliary device 110 through an intermediary (such as the native mobile device 104 or the gateway device 106). If the foreign mobile device 112 is deemed to be "trusted", then the foreign mobile device 112 may be allowed to access the network 108 via the gateway device 106.

Additionally or alternatively, a first user may go to a second user's house (e.g., premises 1020 and bring a laptop computer (e.g., foreign mobile device 112). The first user and the second user may be associated, such as friends, relatives, coworkers, employer/employee, etc. While at the second user's house, the first user may wish to stream a movie from the laptop to a smart television (e.g., native auxiliary device 110) at the second user's house. The laptop may display a menu of available or connected devices at the second user's house. The menu may comprise a selectable indication of the television, such as an icon or a description. The first user may select the indication of the television. Based on the selection of the television, the laptop may broadcast a probe request. The probe request may comprise an indication of a MAC address of the laptop. The probe request may comprise an indication of the television.

A gateway device 106 at the second user's house may receive the probe request. Based on the probe request, the gateway device 106 may determine the MAC address of the laptop. Using the MAC address, the gateway device 106 may query a registry of MAC addresses (e.g., data store 114). The registry may comprise an indication of the MAC address and an indication of a phone number associated with the MAC address (e.g., a phone number of the user of the laptop). The gateway device may access a list of contacts stored to a native mobile device 104 comprising mobile phone of the second user. The gateway device 106 may determine that the list of contacts comprises an indication of the phone number. Based on the list of contacts comprising the indication of the phone number, the gateway device 106 may determine that the laptop comprises a "trusted" device. Based on the determination that the laptop comprises a "trusted" device, the gateway device 106 may enable the laptop to pair with the television. Additionally or alternatively, the gateway device 106 may receive the streamed movie from the laptop and may stream the movie to the television.

The gateway device 106 may store an indication of the MAC address of the laptop to a list of "trusted" devices. The gateway device 106 may store the indication of the MAC address of the laptop to the list of "trusted" devices based on the determination that the laptop comprises a "trusted" device. On a subsequent visit to the second user's house, the first user may bring the laptop and may select an indication of a native auxiliary device 110 comprising a home automation hub at the second user's house via the menu displayed on the laptop. Based on the selection, the laptop may broadcast a probe request. The probe request may comprise an indication of the MAC address of the laptop and an indication the home automation hub. The gateway device 106 may receive the probe request. The gateway device 106 may determine that the list of "trusted" devices comprises the MAC address of the laptop and may enable the laptop to control the home automation hub.

Figure 2:
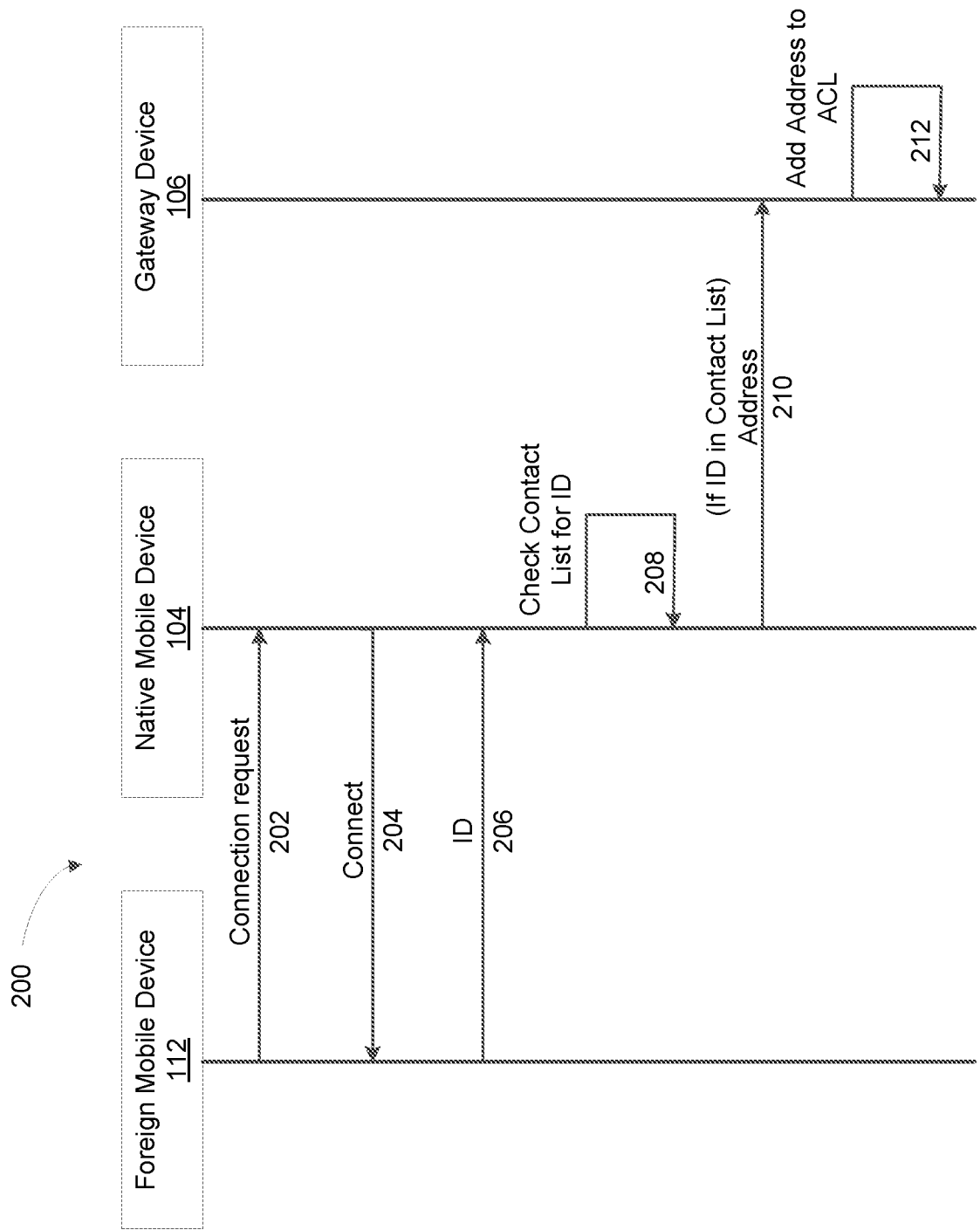
FIG. 2 is an example sequence diagram.

FIG. 2 is an example sequence diagram 200. At 202, the foreign mobile device 112 may transmit a connection request to the native mobile device 104. The native mobile device 104 may derive a MAC address associated with the foreign mobile device 112 from the connection request received at 202. At 204, the native mobile device 104 may connect with the foreign mobile device 112. At 206, the foreign mobile device 112 may transmit an identifier to the native mobile device 104. The identifier may comprise, for example, a phone number associated with the foreign mobile device 112. The native mobile device 104 may receive the identifier by using the derived MAC address to perform a query in the data store 114, bypassing 204 and 206. At 208, the native mobile device 104 may search a contact list for the identifier. For example, the native mobile device 104 may determine if an indication of the phone number associated with the foreign mobile device 112 is in a contact list. The native mobile device 104 may comprise the contact list. At 210, if an indication of the identifier is in the contact list, then the native mobile device 104 may transmit an indication of an address to the gateway device 106. The address may comprise the MAC address associated with the foreign mobile device 112. At 212, the gateway device 106 may store an indication of the address to an access control list (ACL). Once the indication of the address associated with the foreign mobile device 112 is stored to the ACL, the foreign mobile device 112 may be able to access the network 108 via the gateway device 106.

Although FIG. 2 shows an example where the foreign mobile device 112 is granted access to the network 108 via the gateway device 106, similarly, once the foreign mobile device 112 is deemed "trusted", the foreign mobile device 112 may be granted access to a resource, such as native auxiliary device 110. The native mobile device 104 may comprise an application with a user interface that allows a user to select resources to share with the foreign mobile device 112. If the user selects that the native auxiliary device 110 may be shared, then the native mobile device 104 may appear to be the native auxiliary device 110 to the foreign mobile device 112. The foreign mobile device 112 may transmit data to the native mobile device 104, which, in turn, may act as a relay to the native auxiliary device 110. For example, the native mobile device 104 may proxy a pairing between the foreign mobile device 112 and the native auxiliary device 110 with the native mobile device 104 performing an entitlement check. An application running on the foreign mobile device 112 may handle communication between the foreign mobile device 112 and the native auxiliary device 110 once the foreign mobile device 112 is deemed "trusted". In response to a communication that the foreign mobile device 112 is deemed "trusted", the application may cause the native auxiliary device 110 to show up as a selectable device on a user interface associated with the application running on the foreign mobile device 112. Upon selection, the foreign mobile device 112 may pair with the native auxiliary device 110.

Additionally or alternatively, rooms of a hotel (e.g., premises 102) may be equipped with electronic locks (e.g., native auxiliary devices 110), such as locks configured to communicate via Bluetooth or radio frequency (RF). A concierge at the hotel may access an application on a computing device (e.g., native mobile device 104) at the front desk of the hotel. The application may comprise an indication of the rooms and the electronic locks on the doors of the rooms. The concierge may receive a notification that a guest made a reservation on a mobile phone (e.g., foreign mobile device 112) for a room at the hotel. The concierge may select a room to reserve for the guest. Using the application, the concierge may select an option to share the electronic lock on the room with the mobile device of the guest. The concierge may select an option to share the electronic lock on the room with the mobile device for the duration of the guest's reservation.

The guest may arrive at the hotel and the mobile phone may display an indication that the electronic lock on the room is available for use by the mobile phone. The guest may select an option to use the electronic lock displayed on the mobile phone. In response to the user input, the mobile phone may send a probe request to an electronic key controller (e.g., native mobile device 104 or gateway device 106) at the hotel. The electronic key controller may enable the mobile phone to send a code or a signal to the electronic lock. Based on the code or the signal, the electronic lock may unlock and the guest may enter the room.

Additionally or alternatively, a business (e.g., premises 102) may have various native auxiliary devices 110. Via an application on a gateway device 106 or a native mobile device 104, a first group of the native auxiliary devices 110 may be selected to be visible to foreign mobile devices 112 associated with employees of the business. The first group may comprise native auxiliary devices 110 such as temperature control devices and devices that control access to cash registers or restricted areas of the business. A second group of the native auxiliary devices 110 may be selected to be visible to foreign mobile devices 112 that are not recognized as employees of the business, such as foreign mobile devices 112 of customers, service providers, or the public. The second group may comprise native auxiliary devices 110 such as a wireless access device or a price check device.

In response to receiving a probe request from a foreign mobile device 112 at the business, a gateway device 106 at the business may determine a MAC address of the foreign mobile device 112. The gateway device 106 may determine whether a database of employees of the business and MAC addresses associated with employee devices (e.g., data store 114) comprises an indication of the foreign mobile device 112. Based on a determination that the database of employees comprises an indication of the foreign mobile device 112, the gateway device 106 may send the foreign mobile device 112 an indication that the first group of native auxiliary devices 110 is available. The gateway device 106 may cause a menu of the first group of native auxiliary devices 110 to be output on the foreign mobile device 112. Based on a determination that the database of employees does not comprise an indication of the foreign mobile device 112, the gateway device 106 may send the foreign mobile device 112 an indication that the second group of native auxiliary devices 110 is available. The gateway device 106 may cause a menu of the second group of native auxiliary devices 110 to be output on the foreign mobile device 112.

Figure 3:
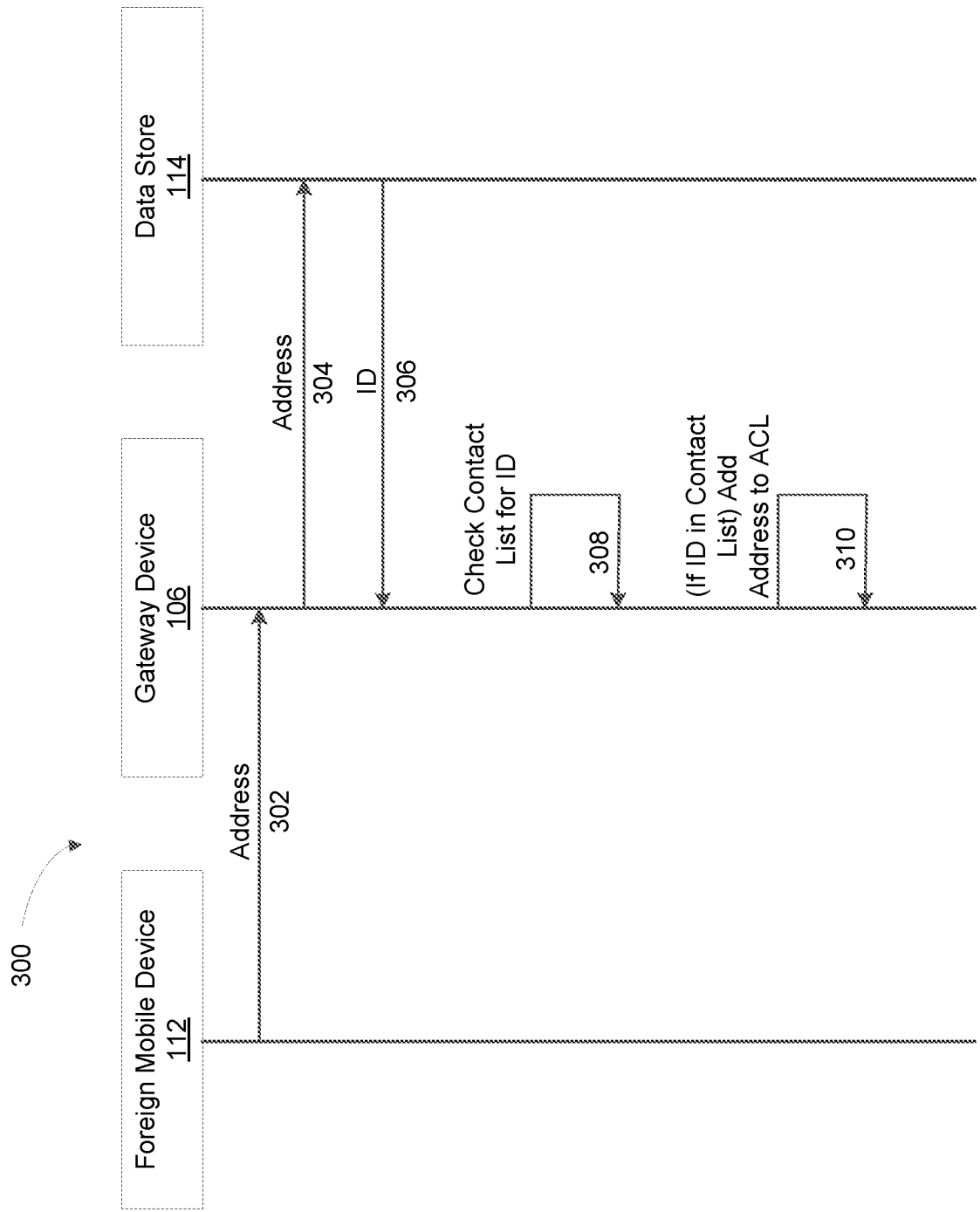
FIG. 3 is an example sequence diagram.

FIG. 3 is an example sequence diagram 300. At 302, the foreign mobile device 112 may transmit an address to the gateway device 106. The address may comprise a MAC address associated with the foreign mobile device 112. At 304, the gateway device 106 may transmit the address to the data store 114. At 306, the data store 114 may transmit an identifier associated with the address to the gateway device 106. For example, the identifier may comprise a phone number, an account number, a name associated with the foreign mobile device 112 or a name, account, address, username, or date of birth of a user of the foreign mobile device 112. At 308, the gateway device 106 may search a contact list for the identifier. The gateway device 106 may search the contact list for an indication of the phone number associated with the foreign mobile device 112. The contact list may be associated with the native mobile device 104. The gateway device 106 may access the contact list via an application in communication with the native mobile device 104. At 310, if the contact list comprises the identifier, then the gateway device 106 may store an indication of the address to the ACL. Once the indication of the address associated with the foreign mobile device 112 is stored to the ACL, the foreign mobile device 112 may be able to access the network 108 via the gateway device 106.

A plurality of contact lists may be created, where members of a particular contact list or grouping is associated with certain access control parameters. For example, one contact list may be associated with network resources and services such as content services, while a second contact list may be associated with security services. As such, a user may use the contact lists to manage access control of visiting devices accessing a premise network and network resources or services.

Although FIG. 3 shows an example where the foreign mobile device 112 is granted access to the network 108 via the gateway device 106, similarly, once the foreign mobile device 112 is deemed "trusted", the foreign mobile device 112 may be granted access to a resource, such as native auxiliary device 110. The native mobile device 104 may comprise an application with a user interface that allows a user to select resources to share with the foreign mobile device 112. If the user selects that the native auxiliary device 110 may be shared, then the native mobile device 104 may appear to be the native auxiliary device 110 to the foreign mobile device 112. The foreign mobile device 112 may transmit data to the native mobile device 104, which, in turn, may act as a relay to the native auxiliary device 110. The native mobile device 104 may proxy a pairing between the foreign mobile device 112 and the native auxiliary device 110 with the native mobile device 104 performing an entitlement check. An application running on the foreign mobile device 112 may handle communication between the foreign mobile device 112 and the native auxiliary device 110 once the foreign mobile device 112 is deemed "trusted". In response to a communication that the foreign mobile device 112 is deemed "trusted", the application may cause the native auxiliary device 110 to show up as a selectable device on a user interface associated with the application running on the foreign mobile device 112. Upon selection, the foreign mobile device 112 may pair with the native auxiliary device 110.

At a school campus, a gateway device 106 may maintain a registry of students of the school and MAC addresses of devices associated with the students. A visitor may attempt to connect to a wireless network at the school using a smart watch (e.g., foreign mobile device 112). In response to the user input, the smart watch may send an indication of a MAC address of the smart watch to the gateway device 106. In response to receiving the indication of the MAC address, the gateway device 106 may determine that the registry does not comprise an indication of the MAC address. Based on the determination that the registry does not comprise an indication of the MAC address of the smart watch, the gateway device 106 may determine that the user of the smart watch is not a student of the school. Based on the determination that the registry does not comprise an indication of the MAC address of the smart watch, the gateway device 106 may determine not to grant the smart watch access to the wireless network.

Alternatively or additionally, based on the determination that the registry does not comprise an indication of the MAC address of the smart watch, the gateway device 106 may access a registry of MAC addresses and associated identifiers. Using registry and the MAC address, the gateway device 106 may determine a name of a user of the smart watch. The gateway device may access a roster of names of students enrolled in the school for the current semester and may determine that the roster comprises an indication of the name of the user. Based on the determination that the roster comprises the indication of the name of the user, the gateway device 106 may determine that the user is a student of the school. Based on the determination that the roster comprises the indication of the name of the user, the gateway device 106 may determine to grant the smart watch access to the wireless network. Based on the determination that the roster comprises the indication of the name of the user, the gateway device 106 may store an indication of the MAC address of the smart watch in the registry of students.

Figure 4:
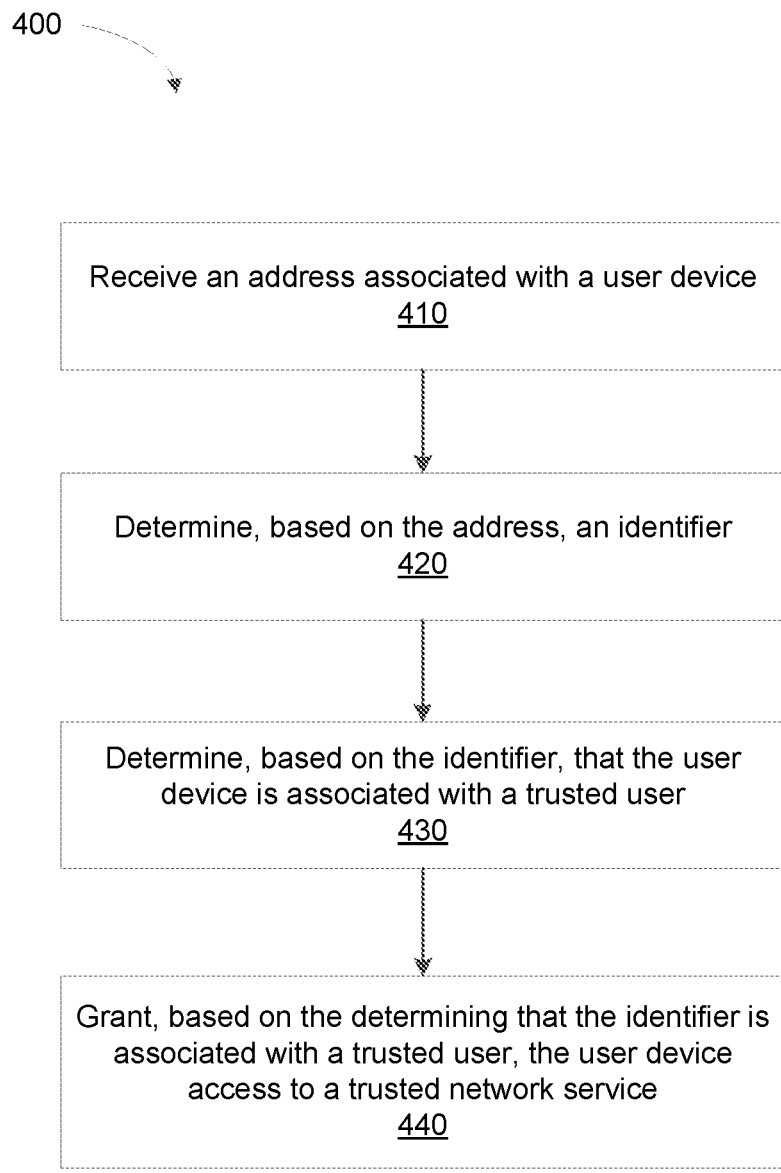
FIG. 4 is a flow diagram of an example method.

FIG. 4 shows an example method. At step 410, an address associated with a user device may be received. The native mobile device 104 in FIG. 1 may receive an address associated with the foreign mobile device 112 in FIG. 1. The gateway device 106 in FIG. 1 may receive an address associated with the foreign mobile device 112 in FIG. 1. The address may comprise a media access control (MAC) address. The receiving the address associated with the user device may comprise receiving a probe message associated with the user device. The native mobile device 104 in FIG. 1 may receive a probe message associated with the foreign mobile device 112 in FIG. 1. The gateway device 106 in FIG. 1 may receive a probe message associated with the foreign mobile device 112 in FIG. 1.

At step 420, an identifier may be determined based on the address. The native mobile device 104 in FIG. 1 may determine, based on the address, an identifier. The gateway device 106 in FIG. 1 may determine, based on the address, an identifier. The identifier may comprise a user name. The identifier may comprise a telephone number. The determining the identifier may comprise causing a lookup operation of a data store. The native mobile device 104 in FIG. 1 may cause a lookup operation of the data store 114 in FIG. 1. The gateway device 106 in FIG. 1 may cause a lookup operation of the data store 114 in FIG. 1.

At step 430, a determination may be made that the user device is associated with a "trusted user," such as based on a determination that identifier is associated with a "trusted" user. The native mobile device 104 in FIG. 1 may determine that the identifier is associated with a "trusted" user. The gateway device 106 in FIG. 1 may determine that the identifier is associated with a "trusted" user. The determining that the identifier is associated with a "trusted" user may comprise comparing the identifier to a contact list. The native mobile device 104 in FIG. 1 may compare the identifier to a contact list. The gateway device 106 in FIG. 1 may compare the identifier to a contact list. The determining that the identifier is associated with a "trusted" user may comprise comparing the identifier to a calendar. The native mobile device 104 in FIG. 1 may compare the identifier to a calendar. The gateway device 106 in FIG. 1 may compare the identifier to a calendar. The determining that the identifier is associated with a "trusted" user may comprise determining a timeframe based on the comparison of the identifier to the calendar. The native mobile device 104 in FIG. 1 may determine a timeframe based on the comparison of the identifier to the calendar. The gateway device 106 in FIG. 1 may determine a timeframe based on the comparison of the identifier to the calendar.

At step 440, the user device may be granted access to a trusted network service. The user device may be granted access to the trusted network service based on the determining that the identifier is associated with a "trusted" user. The native mobile device 104 in FIG. 1 may grant, based on the determining that the identifier is associated with a "trusted" user, the foreign mobile device 112 in FIG. 1 access to the network 108 in FIG. 1 and/or the native auxiliary device 110 in FIG. 1. The gateway device 106 in FIG. 1 may grant, based on the determining that the identifier is associated with a "trusted" user, the foreign mobile device 112 in FIG. 1 access to the network 108 in FIG. 1 and/or the native auxiliary device 110 in FIG. 1. The granting the user device access to the trusted network service may comprise granting the user device access to a select private network service of a plurality of private network services. The native mobile device 104 in FIG. 1 may grant the foreign mobile device 112 in FIG. 1 access to a select private network service of a plurality of private network services. The gateway device 106 in FIG. 1 may grant the foreign mobile device 112 in FIG. 1 access to a select private network service of a plurality of private network services. The plurality of private network services may comprise one or more of audio services, video services, or premises management services. As non-limiting examples, the network services may comprise services associated with Amazon Echo, Sonos speakers, Harmon or Kardon speakers, Apple AirPlay, Xfinity Xfi, Xfinity Home, Google Home Max, Sony TV screen-sharing, or Phillips Hue lighting and home system. Network services may comprise the use of premises devices that may be coupled to a premises network.

The granting the user device access to the trusted network service may comprise granting the user device access to a select private network resource of a plurality of private network resources. The native mobile device 104 in FIG. 1 may grant the foreign mobile device 112 in FIG. 1 access to a select private network resource of a plurality of private network resources. The gateway device 106 in FIG. 1 may grant the foreign mobile device 112 in FIG. 1 access to a select private network resource of a plurality of private network resources. The plurality of private network resources may comprise one or more of a speaker, a microphone, a display, a media player, a camera, a security controller, a home automation device, a home automation controller, a security system device, or another resource capable of network connectivity.

The granting the user device access to the trusted network service may comprise causing an access control list to be updated. The native mobile device 104 in FIG. 1 may cause an access control list associated with the gateway device 106 in FIG. 1 to be updated with the address associated with the foreign mobile device 112 in FIG. 1. The gateway device 106 in FIG. 1 may cause an access control list to be updated with the address associated with the foreign mobile device 112 in FIG. 1. The granting, based on the determining that the identifier is associated with a "trusted" user, the user device access to a trusted network device may comprise granting the user device access to a trusted network device at or around the determined timeframe. The native mobile device 104 in FIG. 1 may grant the foreign mobile device 112 in FIG. 1 access to the network 108 in FIG. 1 and/or the native auxiliary device 110 in FIG. 1 at or around the determined timeframe. As an example, the gateway device 106 in FIG. 1 may grant the foreign mobile device 112 in FIG. 1 access to the network 108 in FIG. 1 and/or the native auxiliary device 110 in FIG. 1 at or around the determined timeframe.

For example, a user may have a mobile device. The user may reside in a premises. The premises may comprise a gateway device for accessing a network. The mobile device may comprise a calendar. The calendar may indicate that a contact (e.g., a friend, acquaintance, etc.) will visit the premises at a time, such as at 6:00 PM today, and leave at a second time, such as at 8:00 PM today. The mobile device may share information, such as the time that the contact will arrive at the premises, the time the contact leave the premises, the contact's phone number, and/or the contact's name, with the gateway device. The gateway device may use the contact's phone number and/or name to perform a lookup operation at a data store over the network to retrieve a MAC address associated with the contact's phone. The gateway device may store an indication of the retrieved MAC address to an access control list at 6:00 PM today or at some predetermined time before or after 6:00 PM today. The gateway device may store an indication of the retrieved MAC address to the access control list at 5:45 PM today. Based on the contact arriving at the premises, the contact may be able to access the network via the contact's mobile device associated with the retrieved MAC address. The gateway device may remove the indication of the retrieved MAC address from the access control list at 8:00 PM today or at some predetermined time before or after 8:00 PM today. The gateway device may remove the indication of the retrieved MAC address from the access control list at 8:15 PM today.

For example, a user may have a mobile device (a native mobile device 104). The user may reside in a premises. The premises may comprise a gateway device for accessing a network. The native mobile device may comprise a contact list. A contact in the contact list may arrive at the premises. The contact may wish to access speakers through a mobile device (a foreign mobile device 112). The foreign mobile device may transmit a probe request to the native mobile device. The probe request may comprise an address associated with the foreign mobile device, such as a MAC address associated with the foreign mobile device. The native mobile device 104 may transmit the address to a data store and cause the data store to perform a lookup operation to retrieve an identifier associated with the foreign mobile device (such as a phone number and/or a name associated with the foreign mobile device). The native mobile device may receive the identifier associated with the foreign mobile device from the data store. The native mobile device may search the contact list for the identifier. Based on the contact list comprising an indication of the identifier, the native mobile device may facilitate communication between the speakers and the foreign mobile device. The native mobile device may pair with the speakers. The native mobile device may appear as the speakers to the foreign mobile device. The foreign mobile device may stream music to the native mobile device, which then may stream the music to the speakers.

Figure 5:
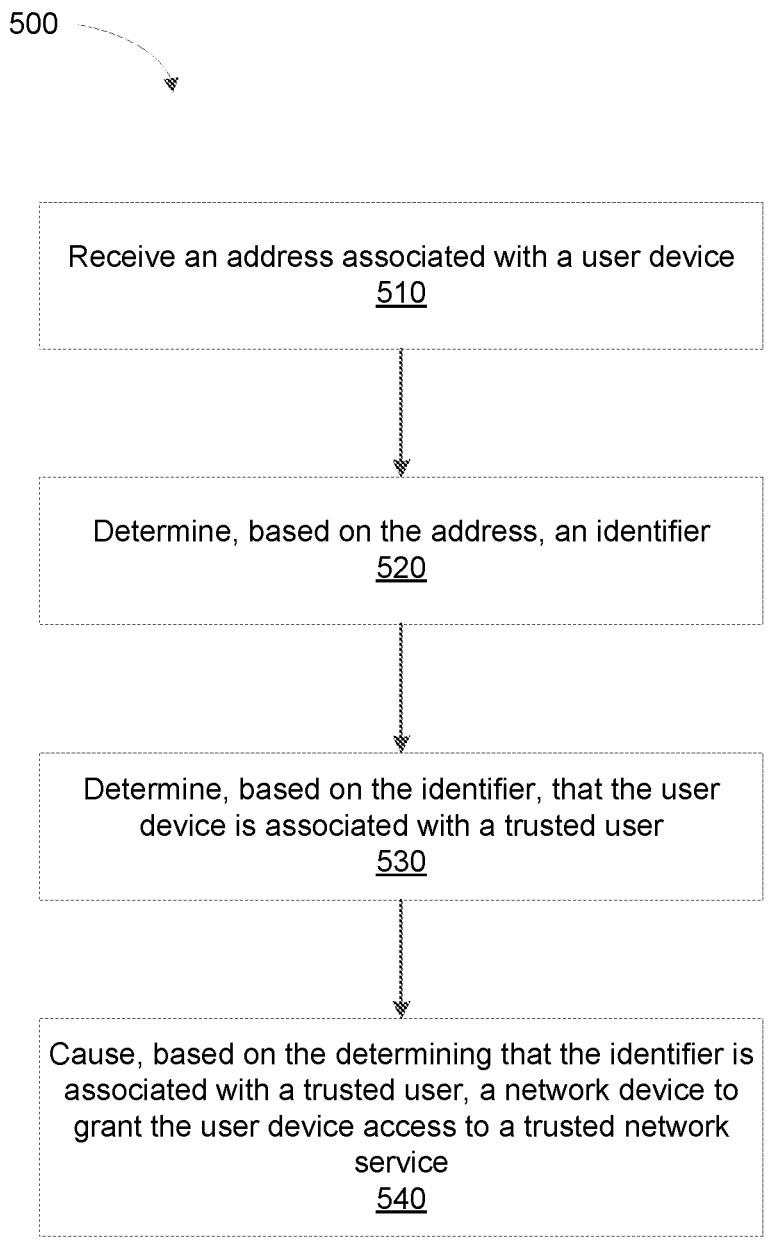
FIG. 5 is a flow diagram of an example method.

FIG. 5 shows an example method. At step 510, an address associated with a user device may be received by a host device. The native mobile device 104 in FIG. 1 may receive an address associated with the foreign mobile device 112 in FIG. 1. The address may comprise a media access control (MAC) address. The receiving the address associated with the user device may comprise receiving a probe message associated with the user device. The native mobile device 104 in FIG. 1 may receive a probe message associated with the foreign mobile device 112 in FIG. 1.

At step 520, an identifier may be determined based on the address. The native mobile device 104 in FIG. 1 may determine, based on the address, an identifier. The identifier may comprise a user name. The identifier may comprise a telephone number. The determining the identifier may comprise causing a lookup operation of a data store. The native mobile device 104 in FIG. 1 may cause a lookup operation of the data store 114 in FIG. 1.

At step 530, a determination may be made that the user device is associated with a "trusted" user, such as based on a determination that the identifier is associated with a "trusted" user. The native mobile device 104 in FIG. 1 may determine that the identifier is associated with a "trusted" user. The determining that the identifier is associated with a "trusted" user may comprise comparing the identifier to a contact list. The native mobile device 104 in FIG. 1 may compare the identifier to a contact list. The determining that the identifier is associated with a "trusted" user may comprise comparing the identifier to a calendar. The native mobile device 104 in FIG. 1 may compare the identifier to a calendar. The determining that the identifier is associated with a "trusted" user may comprise determining a timeframe based on the comparison of the identifier to the calendar. The native mobile device 104 in FIG. 1 may determine a timeframe based on the comparison of the identifier to the calendar.

At step 540, a network device may be caused to grant the user device access to a "trusted" network service. The network device may be caused to grant the user device access to the "trusted" network service based on the determining that the identifier is associated with a "trusted" user. The native mobile device 104 in FIG. 1 may cause, based on the determining that the identifier is associated with a "trusted" user, the gateway device 106 to grant the foreign mobile device 112 access to the network 108 in FIG. 1 and/or the native auxiliary device 110 in FIG. 1. The "trusted" network service may comprise one or more of audio services, video services, or premises management services. The causing a network device to grant the user device access to the "trusted" network service may comprise causing an access control list to be updated. The native mobile device 104 in FIG. 1 may cause an access control list associated with the gateway device 106 in FIG. 1 to be updated with the address associated with the foreign mobile device 112 in FIG. 1. The granting, based on the determining that the identifier is associated with a "trusted" user, the user device access to a "trusted" network device may comprise granting the user device access to a "trusted" network device at or around the determined timeframe. The native mobile device 104 in FIG. 1 may grant the foreign mobile device 112 in FIG. 1 access to the network 108 in FIG. 1 and/or the native auxiliary device 110 in FIG. 1 at or around the determined timeframe.

For example, a user may have a mobile device (e.g., a host device or a native mobile device 104). The user may reside in a premises. The premises may comprise a gateway device for accessing a network. The host device may comprise a contact list. A contact in the contact list may arrive at the premises. The contact may wish to access speakers (e.g., native auxiliary device 110 through a mobile device (e.g., foreign mobile device 112). The foreign mobile device may transmit a probe request to the host device. The probe request may comprise an address associated with the foreign mobile device, such as a MAC address associated with the foreign mobile device. The host device may use the address to form a connection with the foreign mobile device. An identifier associated with the foreign mobile device (such as a phone number and/or a name associated with the foreign mobile device 112) may be transmitted to the host device from the foreign mobile device via the connection. The host device may search the contact list for an indication of the identifier. Based on the contact list comprising the indication of the identifier, the host device may facilitate communication between the speakers and the foreign mobile device. The host device may pair with the speakers. The host device may appear as the speakers to the foreign mobile device. The foreign mobile device may stream music to the host device, which then may stream the music to the speakers.

For example, a user may have a mobile device (e.g., host device or a native mobile device 104). The user may reside in a premises. The premises may comprise a gateway device for accessing a network. The host device may comprise a contact list. A contact in the contact list may arrive at the premises. The contact may wish to access speakers (e.g., native auxiliary device 110) through a mobile device (e.g., foreign mobile device 112). The foreign mobile device may transmit a probe request to the host device. The probe request may comprise an address associated with the foreign mobile device, such as a MAC address associated with the foreign mobile device. The host device may transmit the address to a data store and cause the data store to perform a lookup operation to retrieve an identifier associated with the foreign mobile device (such as a phone number and/or a name associated with the foreign mobile device 112). The host device may receive the identifier associated with the foreign mobile device from the data store. The host device may search the contact list for an indication of the identifier. Based on the contact list comprising the indication of the identifier, the host device may facilitate communication between the speakers and the foreign mobile device. The host device may pair with the speakers. The host device may appear as the speakers to the foreign mobile device. The foreign mobile device may stream music to the host device, which then may stream the music to the speakers.

Figure 6:
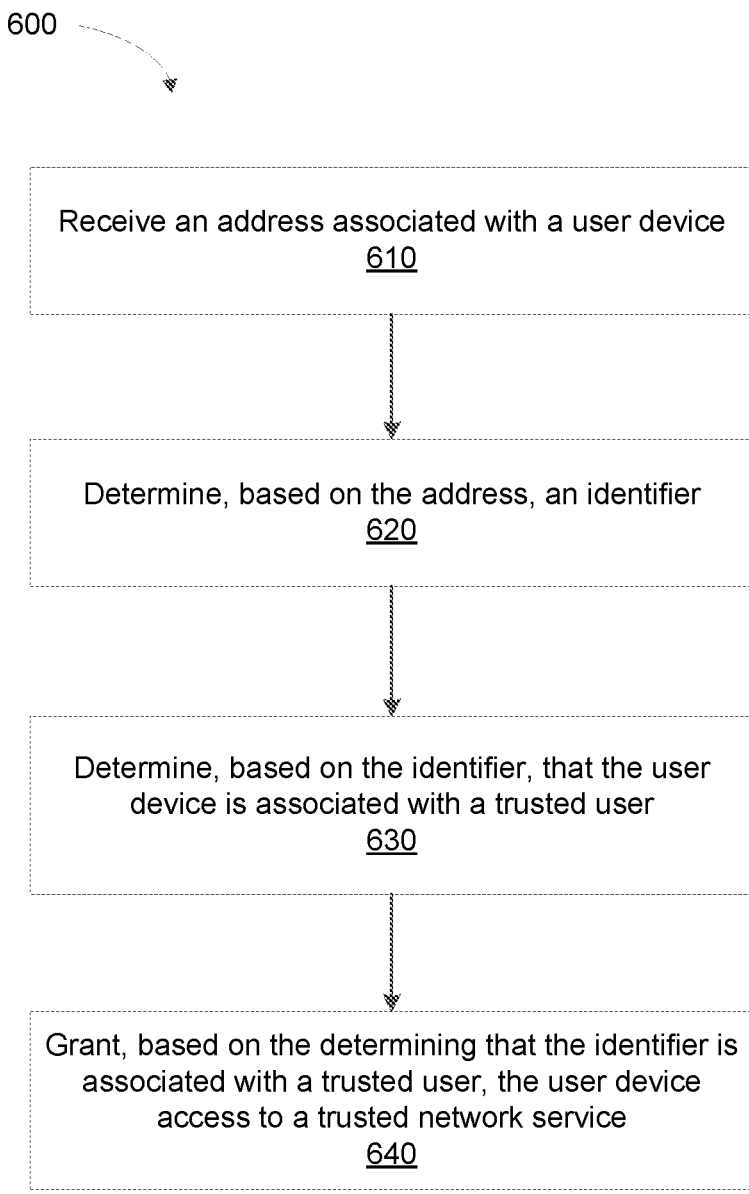
FIG. 6 is a flow diagram of an example method.

FIG. 6 shows an example method. At step 610, an address associated with a user device may be received by a gateway device. The gateway device 106 in FIG. 1 may receive an address associated with the foreign mobile device 112 in FIG. 1. The address may comprise a media access control (MAC) address. The receiving the address associated with the user device may comprise receiving a probe message associated with the user device. The gateway device 106 in FIG. 1 may receive a probe message associated with the foreign mobile device 112 in FIG. 1.

At step 620, an identifier may be determined. The identifier may be determined based on the address. The gateway device 106 in FIG. 1 may determine, based on the address, an identifier. The identifier may comprise a user name. The identifier may comprise a telephone number. The determining the identifier may comprise causing a lookup operation of a data store. The gateway device 106 in FIG. 1 may cause a lookup operation of the data store 114 in FIG. 1.

At step 630, a determination may be made that the user device is associated with a "trusted" user, such as based on a determination may be made that the identifier is associated with a "trusted" user. The gateway device 106 in FIG. 1 may determine that the identifier is associated with a "trusted" user. The determining that the identifier is associated with a "trusted" user may comprise comparing the identifier to a contact list. The gateway device 106 in FIG. 1 may compare the identifier to a contact list. The determining that the identifier is associated with a "trusted" user may comprise sending, to a host device, the identifier. The gateway device 106 in FIG. 1 may send the identifier to the native mobile device 104 in FIG. 1. The determining that the identifier is associated with a "trusted" user may comprise receiving, from the host device, a message indicating the identifier is associated with a "trusted" user. The gateway device 106 in FIG. 1 may receive, from the native mobile device 104 in FIG. 1, a message indicating that the identifier is associated with a "trusted" user.

At step 640, the user device may be granted access to a trusted network service. The user device may be granted access to the trusted network service based on the determining that the identifier is associated with a "trusted" user. The gateway device 106 in FIG. 1 may grant, based on the determining that the identifier is associated with a "trusted" user, the foreign mobile device 112 in FIG. 1 access to the network 108 in FIG. 1 and/or the native auxiliary device 110 in FIG. 1. The granting the user device access to the trusted network service may comprise granting the user device access to a select private network service of a plurality of private network services. The gateway device 106 in FIG. 1 may grant the foreign mobile device 112 in FIG. 1 access to a select private network service of a plurality of private network services. The plurality of private network services may comprise one or more of audio services, video services, or premises management services. The granting the user device access to the trusted network service may comprise granting the user device access to a select private network resource of a plurality of private network resources. The gateway device 106 in FIG. 1 may grant the foreign mobile device 112 in FIG. 1 access to a select private network resource of a plurality of private network resources. The plurality of private network resources may comprise one or more of a speaker, a microphone, a display, a camera, a security controller, or a home automation controller. The granting the user device access to the trusted network service may comprise causing an access control list to be updated. The gateway device 106 in FIG. 1 may cause an access control list to be updated with the address associated with the foreign mobile device 112 in FIG. 1.

For example, a user may have a mobile device (e.g., native mobile device 104). The user may reside in a premises. The premises may comprise a gateway device for accessing a network. The native mobile device may comprise a contact list. A contact in the contact list may arrive at the premises. The contact may wish to access the network through a gateway device via a mobile device (e.g., foreign mobile device 112). The foreign mobile device may transmit a probe request to the gateway device. The probe request may comprise an address associated with the foreign mobile device, such as a MAC address associated with the foreign mobile device. The gateway device may cause a lookup operation to be performed on a data store over the network using the address and may retrieve an identifier associated with the foreign mobile device (such as a phone number and/or a name associated with the foreign mobile device 112) from the data store. The gateway device may access the contact list to determine that an indication of the identifier is stored in the contact list. Based on the contact list comprising the indication of the identifier, the gateway device may store an indication of the address to an access control list, allowing the foreign mobile device to access the network via the gateway device.

Figure 7:
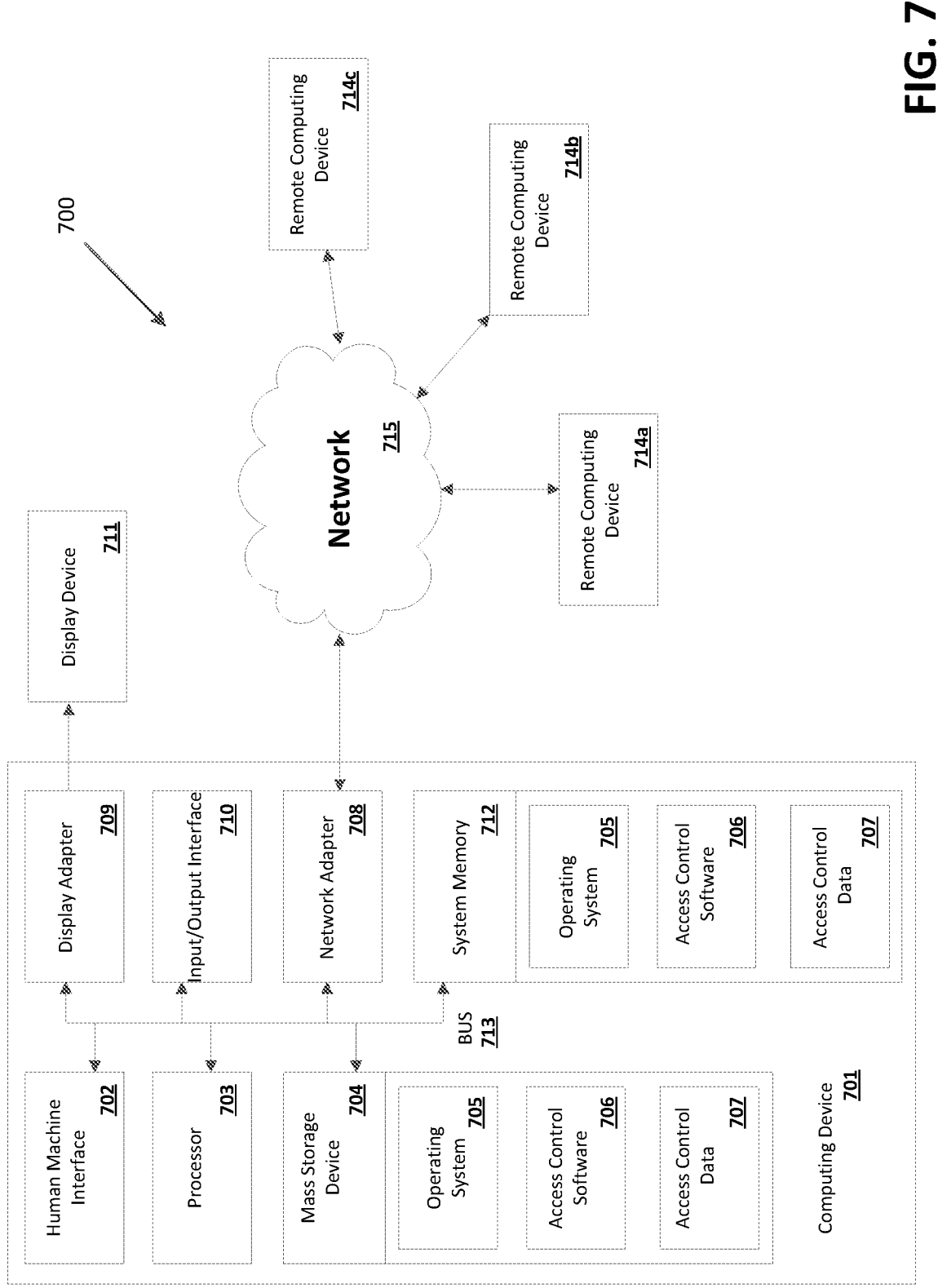
FIG. 7 is a block diagram of an example system environment.

FIG. 7 shows an example operating environment 700 may comprise an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Additionally or alternatively, the systems and methods disclosed may be implemented via a general-purpose computing device in the form of a computing device 701. The components of the computing device 701 may comprise, but are not limited to, one or more processors or processing units 703, a system memory 712, and a system bus 713 that couples various system components including the processor 703 to the system memory 712. In the case of multiple processing units 703, the system may utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description may be implemented over a wired or wireless network connection and each of the subsystems, including the processor 703, a mass storage device 704, an operating system 705, access control software 706, access control data 707, a network adapter 708, system memory 712, an Input/Output Interface 710, a display adapter 709, a display device 711, and a human machine interface 702, may be contained within one or more remote computing devices 714a,b,c at physically separate locations, connected through buses of this form, in effect implementing a fully distributed system.

The computing device 701 may comprise a variety of computer readable media. Example readable media may comprise any available media that is accessible by the computing device 701 and may comprise both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as access control data 707 and/or program modules such as operating system 705 and access control software 706 that are immediately accessible to and/or are presently operated on by the processing unit 703.

The computing device 701 may comprise other removable/non-removable, volatile/non-volatile computer storage media. By way of example, FIG. 7 shows a mass storage device 704 which may provide non-volatile storage of computer code, computer readable instructions, data structures, program modules, and other data for the computing device 701. The mass storage device 704 may comprise a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including by way of example, an operating system 705 and access control software 706. Each of the operating system 705 and access control software 706 (or some combination thereof) may comprise elements of the programming and the access control software 706. Access control data 707 may be stored on the mass storage device 704. Access control data 707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 701 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 703 via a human machine interface 702 that is coupled to the system bus 713, but may be connected by other interface and bus structures, such as a parallel port, game port, an IEEE 1394 Port (also known as a Firewire port), a serial port, or a universal serial bus (USB).

A display device 711 may be connected to the system bus 713 via an interface, such as a display adapter 709. It is contemplated that the computing device 701 may have more than one display adapter 709 and the computer 701 may have more than one display device 711. The display device 711 may comprise a monitor, an LCD (Liquid Crystal Display), or a projector. In addition to the display device 711, other output peripheral devices may comprise components such as speakers (not shown) and a printer (not shown) which may be connected to the computing device 701 via Input/Output Interface 710. Any step and/or result of the methods may be output in any form to an output device. Such output may comprise any form of visual representation, including, but not limited to, textual, graphical, animation, audio, tactile, and the like. The display 711 and computing device 701 may comprise part of one device, or separate devices.

The computing device 701 may operate in a networked environment using logical connections to one or more remote computing devices 714a,b,c. By way of example, a remote computing device may comprise a personal computer, portable computer, a smart phone, a server, a router, a network computer, a peer device or other common network node. Logical connections between the computing device 701 and a remote computing device 714a,b,c may be made via a network 715, such as a local area network (LAN) and a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

As examples, application programs and other executable program components such as the operating system 705 are shown herein as discrete blocks, although such programs and components may reside at various times in different storage components of the computing device 701, and may be executed by the data processor(s) of the computer. An implementation of access control software 706 may be stored on or transmitted across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
receiving, by a host device associated with a first user, an address associated with a user device associated with a second user different from the first user, wherein the host device is authorized to use a trusted network service;
determining, based on the address, an identifier associated with the second user of the user device, wherein the second user is trusted by the first user;
determining, based on the association between the identifier and the trusted second user, that the user device is a trusted device;
granting, based on the determining that the user device is a trusted device, the user device access to the trusted network service; and
sending, by the host device to a third device different from the user device, the address to facilitate future granting of access of the user device to the trusted network service.

2. The method of claim 1, wherein the address comprises a media access control (MAC) address.

3. The method of claim 1, wherein granting the user device access to the trusted network service comprises causing a list of selectable services indicating the trusted network service to output via a user interface on the user device.

4. The method of claim 1, wherein the identifier comprises at least one of a user name, an account number, a user first name, a user last name, an email address, a user home address, a user work address, an instant messenger identification, a user date of birth or a telephone number.

5. The method of claim 1, wherein the determining, based on the identifier, that the user device is associated with a trusted device comprises comparing the identifier to one or more of:
a contact list associated with the first user,
a contact list associated with network resources,
a contact list associated with network services,
a contact list associated with content services,
a contact list associated with security services, or
a calendar.

6. The method of claim 1, wherein the granting the user device access to the trusted network service comprises granting the user device access to a select private network service or resource of a plurality of private network services and resources,
wherein the plurality of private network services comprises one or more of audio services, video services, premises management services, a speaker, a microphone, a display, a camera, a security controller, a home automation controller, an alarm, a sensor, a security system control panel, a lock, a window, or a door.

7. The method of claim 1, comprising receiving, via a user interface, a selection to share one or more resources of the trusted network service, wherein the granting the user device access to the trusted network service is further based on the selection to share the one or more resources of the trusted network service.

8. The method of claim 1, wherein the host device and the user device are each located at a premise during, at least, the granting the user device access to the trusted network service.

9. The method of claim 1, wherein the host device comprises at least one of a gateway device, a mobile device, or a user device associated with the first user, and wherein the user device associated with the second user comprises at least one of a mobile device, a smart phone, a tablet computer, a laptop computer, or a wearable computing device.

10. The method of claim 1, further comprising:
receiving, by the user device, content associated with the trusted network service.

11. The method of claim 1, wherein the granting the user device access to the trusted network service comprises allowing the user device to perform at least one of:
selecting content associated with the trusted network service,
controlling a first auxiliary device associated with the trusted network service, and
pairing with a second auxiliary device associated with the trusted network service.

12. The method of claim 1, wherein the host device is located at a premises and the user device is located at the premises and the third device is not located at the premises.

13. The method of claim 1, wherein the address is stored in an access control list.

14. The method of claim 13, wherein the access control list is for granting future access to the trusted network service without first determining, based on the address, the identifier associated with the user device and without first determining, based on the identifier, that the user device is associated with a trusted device.

15. The method of claim 1, wherein determining that the user device is associated with a trusted device comprises transmitting the address to the third device and receiving, from the third device, the identifier.

16. The method of claim 1, wherein, after the granting the user device access, the user device is provided access to the trusted network service by a device other than the host device.

17. A computing device comprising:
one or more processors; and
memory storing instructions that, when executed by the one or more processors, cause the computing device to:
receive an address associated with a user device associated with a second user that is different from a first user associated with the computing device, wherein the computing device is authorized to use a trusted network service;
determine, based on the address, an identifier associated with the second user of the user device, wherein the second user is trusted by the first user;
determine, based on the association between the identifier and the trusted second user, that the user device is a trusted device;
cause, based on a determination that the user device is a trusted device, a network device to grant the user device access to the trusted network service; and
send, to a device different from the user device, the address to facilitate future granting of access of the user device to the trusted network service.

18. The computing device of claim 17, wherein the instructions further cause the computing device to receive an indication of a time or date that the trusted network service can be accessed; and
wherein the instructions further cause the network device to grant the user device access to the trusted network service at the time or on the date.

19. The computing device of claim 17, wherein the instructions that cause the computing device to cause the network device to grant the user device access to the trusted network service causes the computing device to grant the user device access to a select private network service or resource of a plurality of private network services or resources,
wherein the plurality of private network services or resources comprises one or more of audio services, video services, premises management services, a speaker, a microphone, a display, a camera, a security controller a home automation controller an alarm a sensor, a security system control panel, a lock, a window, or a door.

20. The computing device of claim 17, wherein the trusted network service is associated with a premises; and
wherein the instructions further cause the computing device to receive the address associated with the user device based on the user device being located at the premises.

21. The computing device of claim 17, wherein the instructions that cause the computing device to determine the identifier further cause the computing device to one or more of:
cause a lookup operation of a data store;
compare the identifier to a contact list; or
compare the identifier to a calendar.

22. The computing device of claim 17, wherein the instructions that cause the computing device to cause the network device to grant the user device access to the trusted network service further cause an access control list to be updated.

23. The computing device of claim 17, wherein the computing device is located at a premise and the user device is located at the premise.

24. The computing device of claim 17, wherein the computing device comprises at least one of a gateway device, a mobile device, or a second user device and wherein a user device associated with the first user comprises at least one of a mobile device, a smart phone, a tablet computer, a laptop computer, or a wearable computing device.

25. The computing device of claim 17, wherein the network device is located at a premises and wherein the instructions, when executed by the one or more processors, further cause the computing device to cause the network device to grant the user device access to the trusted network service when the user device is located at the premises.

26. A system comprising:
a host device associated with a first user, wherein the host device is authorized to use a trusted network service; and
a user device associated with a second user different than the first user, wherein the host device is configured to:
receive an address associated with the user device associated with the second user;
determine, based on the address, an identifier associated with the second user of the user device, wherein the second user is trusted by the first user;
determine, based on the association between the identifier and the trusted second user, that the user device is a trusted device;
grant, based on a determination that the user device is a trusted device, the user device access to the trusted network service; and
send, to a third device different from the user device, the address to facilitate future granting of access of the user device to the trusted network service.

27. The system of claim 26, further comprising a gateway capable of communicating with the user device for determining that the user device is associated with a trusted device, wherein the gateway is located at a premises and the user device is located at the premises.

28. The system of claim 26, wherein the host device is configured to determine that the identifier is associated with a trusted device by comparing the identifier to one or more of:
a contact list associated with the first user,
a contact list associated with network resources,
a contact list associated with network services,
a contact list associated with content services,
a contact list associated with security services, or
a calendar.

29. The system of claim 26, wherein the host device is configured to grant the user device access to the trusted network service by streaming, to the user device, content from the trusted network service.

30. The system of claim 26, wherein the host device is further configured to store the address associated with the user device to a list of trusted devices; and
grant, based on the list, access to the trusted network service.

* * * * *